United States Patent [19]
De La Fuente

[11] Patent Number: 6,108,987
[45] Date of Patent: Aug. 29, 2000

[54] DAMPING DEVICE FOR ELEMENTS OF A CIVIL ENGINEERING CONSTRUCTION

[75] Inventor: Carlos De La Fuente, Nanterre, France

[73] Assignee: Freyssinet International (STUP), Velizy-Villacoubly, France

[21] Appl. No.: 09/101,160

[22] PCT Filed: Jan. 8, 1997

[86] PCT No.: PCT/FR97/00032

§ 371 Date: Nov. 5, 1998

§ 102(e) Date: Nov. 5, 1998

[87] PCT Pub. No.: WO97/25497

PCT Pub. Date: Jul. 17, 1997

[30] Foreign Application Priority Data

Jan. 9, 1996 [FR] France .................................. 96 00162

[51] Int. Cl.[7] ...................................................... E04B 1/98
[52] U.S. Cl. .......................... 52/167.6; 52/167.8; 188/378
[58] Field of Search ................................ 52/167.8, 167.6; 188/266, 378

[56] References Cited

U.S. PATENT DOCUMENTS 2,090,751  8/1937  Deutsch .
2,309,499  1/1943  Chenault .
5,347,771  9/1994  Kobori et al. .
5,462,141  10/1995  Taylor .

FOREIGN PATENT DOCUMENTS 719666      12/1954  United Kingdom .
1 362 409    8/1974  United Kingdom .
WO 92/13158  8/1992  WIPO .

Primary Examiner—Christopher T. Kent
Attorney, Agent, or Firm—Sughrue, Mion, Zinn, Macpeak & Seas, PLLC

[57] ABSTRACT

A damping device is provided for damping relative displacements between first and second structural elements. The device includes a cylinder which is stationary relative to the first structural element and defines two chambers separated by a wall. A fluid is contained within the chambers. A passage is provided to interconnect the two chambers and at least one both-way valve is provided which shuts off the passage. When the pressure in one of the chambers increases due to movement of the structural elements, the passage is opened to enable the fluid to flow from one chamber to the other.

7 Claims, 2 Drawing Sheets

DAMPING DEVICE FOR ELEMENTS OF A CIVIL ENGINEERING CONSTRUCTION

The present invention relates to a tie device for use between two elements of a civil engineering structure, and it relates more particularly to a hydraulic damping device for use between first and second elements of a civil engineering structure, such as a bridge.

Tie devices, and in particular damping devices, serve in particular to damp the effects of an earthquake, in particular in bridges, either by dissipating energy, or by transmitting force, during the rapid movements caused by the earthquake.

There are two main types of damping devices capable of dissipating energy when operating during an earthquake, namely elastoplastic damping devices and oleodynamic damping devices.

Elastoplastic damping devices dissipate energy by alternating plastic deformation of a metal (in general steel) which, beyond a certain displacement, is stressed beyond its elastic limit. Unfortunately such devices are not very efficient, and they have a very short life and must be replaced after a small number of cycles.

An oleodynamic or hydraulic device generally consists of an actuator or cylinder provided with two chambers separated by a piston. The piston is generally connected to one of the structural elements and the cylinder is fixed to the other structural element. The chambers contain a fluid substance which may be a liquid, e.g. oil, or a more viscous material, e.g. a silicone paste. The principle of such an oleodynamic damping device is that, during an earthquake, the fluid can flow from one side of the piston to the other. Energy is dissipated by headloss and results in the fluid being heated. Such oleodynamic damping devices offer high efficiency but they suffer from a certain number of drawbacks. For the device to be effective, the pressure must be as high as possible as soon as the device starts moving. It is very important for pressure to build up rapidly when the displacement stroke must be restricted to low values so to avoid exceeding excessive stresses in certain elements of the structure, in particular the piers of a bridge. For this purpose, some devices are provided with external pressure accumulators so as to maintain at least some minimum pressure on a permanent basis. However, adding such an external pressure accumulator to the device is generally considered to constitute a complication. Other devices are provided with external discharge valves which open passages when the internal pressure increases suddenly. Such valves are expensive and bulky, and they are also considered to constitute complications with their external hydraulic circuits.

Documents U.S. Pat. No. 5,347,771 and GB-1 362 409 disclose respective devices each provided with two one-way valves, each of which operates in a respective flow direction between the two chambers. Those valves complicate manufacture of the device, and therefore increase manufacturing costs. In addition, the operating reliability is not optimum because of the large number of moving parts and because of the sealing problems related thereto.

Furthermore, that type of oleodynamic damping device is generally provided with an orifice of very small diameter enabling fluid to pass from one chamber to the other, thereby enabling the piston to move at low speed. This makes it possible to compensate for the effects of temperature variations. In that type of device, the piston is generally secured to a rod which passes through the end walls of the cylinder or actuator on either side of the piston. Such a rod is connected to one of the elements of the structure, and the cylinder is fixed to the other element of the structure. When the length of stroke required to enable the device to operate properly is long, e.g. in long bridges subjected to large temperature variations, the rods are long and their diameter must be increased because there is a possibility that the rod might buckle if it is subjected to a large compression force. That results in an undesirable increase in the overall dimensions of the device.

Moreover, in that type of oleodynamic damping device, it is necessary to add an expansion vessel or tank that is capable of absorbing the increase in the volume of the fluid due to temperature increases because, without that precaution, the internal pressure of the device could reach values that are very high. Adding such an external tank to the device, together with its associated hydraulic circuit, is also considered to constitute a complication.

An object of the present invention is to provide a tie device, in particular a damping device, that offers high efficiency, that is simple to manufacture and to use, whose manufacturing cost is low, and that operates reliably.

Another object of the present invention is to provide such a device that does not reproduce the above-mentioned drawbacks. In particular, an object of the present invention is to provide a tie device that makes it possible for pressure to build up very rapidly from an almost zero normal operating pressure. In addition, another object of the present invention is to provide such a device that reduces or eliminates the risk of the rod buckling, and that therefore enables the device to be more compact. Furthermore, another object of the present invention is to provide such device that does not require one or more hydraulic circuits to be added externally to the device.

The present invention thus provides a damping device for use between first and second elements of a civil engineering structure, the damping device being suitable for damping at least in part relative displacements between said first and second structural elements during rapid movements, said device including both a cylinder which is stationary relative to said first structural element and which defines two chambers that are separated by a wall and that contain a fluid substance, and at least one moving piston mounted to slide in said stationary cylinder, said wall being provided with at least one passage which interconnects the two chambers, said damping device being provided with at least one both-way valve which, at rest, shuts off said passage and which, when the pressure in one of said chambers increases due to said second structural element moving rapidly relative to said first structural element, opens said passage, thereby enabling the fluid to flow at high pressure from one chamber to the other, said valve being urged towards its closed position by a resilient member.

In particular, said civil engineering structure may be a bridge, and said first and second structural elements may be an abutment, a pier, or a deck of a bridge.

Other characteristics and advantages of the present invention appear from the following detailed description given by way of non-limiting example and with reference to the accompanying drawings, in which.

The present invention relates to a tie device, in particular a damping device, for use between a first structural element 10 and a second structural element 20 of a civil engineering structure, in particular a bridge. The following detailed description is made with reference to such elements of a bridge.

Figure 1:
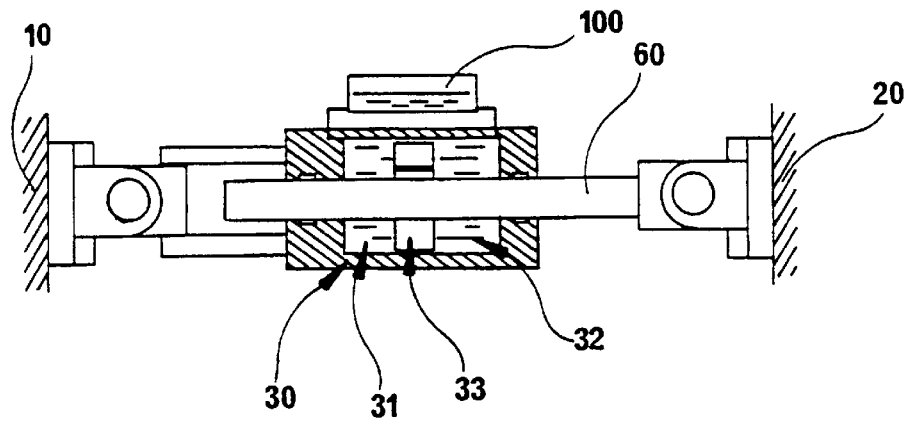
FIG. 1 is a diagrammatic view of a known tie device for use between two elements of a civil engineering structure.

With reference to FIG. 1, which shows a known tie device, and to FIGS. 2 and 3, which show two different embodiments of a device of the invention whose respective advantages are described below, the damping device includes a cylinder 30 (or actuator) which is stationary relative to one of the two structural elements. The cylinder 30 defines two chambers 31, 32 containing a fluid substance (advantageously oil), said chambers 31, 32 being separated by a wall 33.

Figure 4:
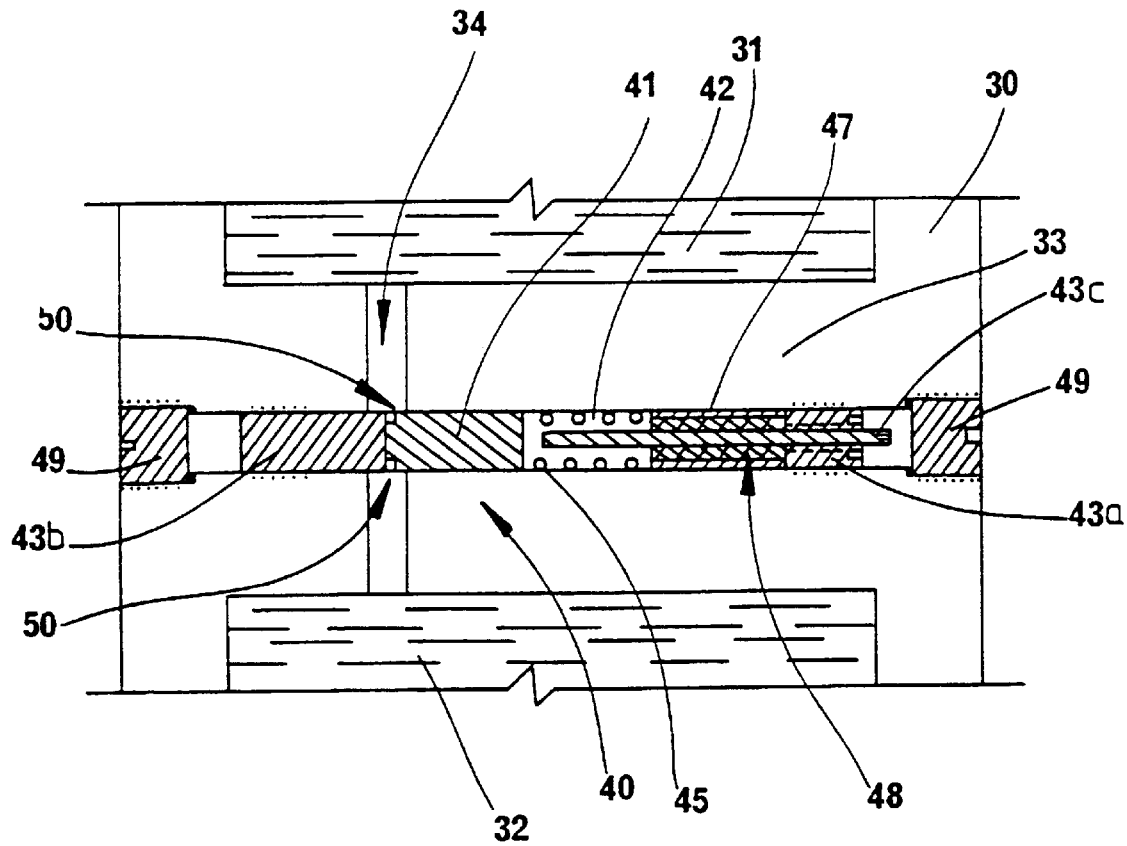
FIG. 4 is a more detailed diagrammatic view of the valve of the damping device of the invention.

As shown in FIG. 4, and according to the invention, said wall 33 is provided with at least one passage 34 which interconnects the two chambers 31, 32, and with at least one valve 40 which, at rest, shuts off said passage 34, and which opens said passage when the pressure in one of said chambers 31, 32 increases due to said second structural element 20 moving rapidly relative to said first structural element 10, in particular in the event of an earthquake. The fluid can thus flow at high pressure from one chamber to the other, and damping is obtained by headloss, which results in said fluid being heated. The invention can be better understood with reference to a single passage 34 provided with a single valve 40, but naturally, any desirable number of passages and/or of valves may be provided.

The valve 40 preferably includes a valve piston 41 mounted to slide in a channel 42 that is substantially perpendicular to said passage 34. Said channel 42 and said valve piston 41 are preferably cylindrical, but the section of the channel is not necessarily constant. Advantageously, as shown in FIG. 4, the channel is disposed in the center of the wall 33 and it crosses said passage 34 that interconnects the two chambers 31, 32. It is shut off at its ends by plugs 49.

At rest, said valve 40 shuts off said passage 34 and, when the pressure in one of said chambers 31, 32 increases, it opens said passage 34, thereby enabling fluid to flow from one chamber to the other so as to provide the desired damping. In particular, it is the valve piston 41 that seals off said passage 34 when the valve is in the closed position, and that opens said passage 34 when the valve is in the open position, said piston 41 being urged towards its closed position by a resilient member 45. The resilient member 45 may advantageously be implemented in the form of a spring which firstly acts on said valve piston 41 and secondly is secured to a first stop member 43a also disposed in said channel 42 and whose position in said channel 42 may be fixed, e.g. by screwing, as a function of the desired pressure from the spring 45. Thus, the spring 45 is of adjustable pressure. Optionally, between the spring 45 and the first stop member 43a, a spacer tube 47 may be provided in the channel 42, which spacer tube serves firstly to support one end of the spring 45 and secondly to receive a small cylinder 48 made of a compressible material such as a foam having closed cells, so that it is possible, by compressing air, to reduce the volume required to enable the valve piston 41 to be displaced, in the event of fluid penetrating into the space situated in the channel 42 and behind the piston 41.

A second stop member 43b is provided in the portion of the channel 42 shown on the left in the figure, which second stop is disposed adjustably and with precision in the channel 42 so as to terminate at a desired point in said passage 34, preferably at its middle. This reduces the diameter of the passage 34 at said point, and the amount of the reduction makes it possible to set the desired damping performance by headloss of the device, as a function of various parameters related to operation of the device, such as in particular the maximum force and the maximum pressure, the maximum speed and the period of the earthquake, and the total stroke length. In a variant, this reduced-diameter portion of the passage 34 may be implemented by means of one or more inserts (not shown) placed in said passage 34 or, for example, by solid cylinders provided with respective calibrated through orifices and inserted laterally into holes that are perpendicular to said passages 34 through which the fluid passes.

In the embodiment shown in FIG. 4, the channel 42 passes through the entire wall 33, but alternatively said channel 42 need not pass right through the entire wall 33, but rather extend on one side of said passage 34 only.

The valve piston 41 is substantially cylindrical, or it may be made up of a plurality of cylindrical portions having different diameters. At that one of its ends which shuts off the passage 34 when it is in the closed position, it is provided with at least one notch 50 that is open to said passage 34, so that, when pressure builds up in either one of the chambers 31, 32, the valve piston 41 opens said passage 34, against the pressure from the spring 45, via the axial component of the force that is applied in said at least one notch 50. Preferably, as shown in FIG. 4, said piston 41 is provided with two diametrically opposite notches 50, each of which is open to a respective portion of the passage 34, on either side of said piston 41 when said piston closes said passage 34. The piston 41 is also advantageously provided with O-rings so as to slide in the channel 42 in fluid-tight manner, thereby preventing, if possible, any fluid from penetrating into said channel 42. The opening stroke of the piston can preferably be adjusted by means of a third stop member 43c which limits the stroke of said piston. The position of the third stop 43c in the channel 42 is thus also adjustable.

Optionally, means (not shown) are provided for preventing the valve piston 41 from rotating about its longitudinal axis in the channel 42. Such means may be of any type, such as ribs, grooves, stops, etc.

The valve of the invention operates as follows:

Under normal operating conditions, i.e. not during earthquakes, the pressure inside the device is very low. The fluid can advantageously flow from one chamber to the other through a small orifice 39 that interconnects said chambers 31, 32, the fluid flowing as a function of slow movements of the structure due to temperature variation. The small orifice 39 thus makes it possible for the structural elements 10 and 20 to be displaced relative to each other during slow movements, and, typically, it has a diameter of about a few tenths of a millimeter. It may be provided through the wall 33 separately from the passage 34, as shown in FIG. 3, but it may also be disposed at the same level as the passage 34, e.g. in the form of a groove provided in a wall of said passage 34. In the event of an earth tremor, the pressure in at least one of the chambers 31, 32 increases very considerably due to the fluid being compressed because the fluid can no longer flow through the small orifice 39. As a result, the valve piston 41, which is pressed by the spring 45 against the plug 49 is also subjected to high lateral pressure from the same side as the chamber that is put under pressure. The force exerted by the pressurized fluid on the substantially cylindrical outside surface of the piston 41 keeps the passage 34 closed, this force being substantially perpendicular to said piston. However, the region in which the notches 50 in the piston are situated, on the side of the piston on which the pressurized chamber is situated, is also subjected to a force which includes an axial component along the axis of the piston 41. Once the axial component is greater than the force of the spring 45, and possibly greater than the friction forces generated by the friction between the piston 41 and the channel 42, the piston 41 can be moved against the force of the spring. Whereupon, the piston 41 moves away from the plug 49 and the axial area subjected to the pressure of the fluid increases considerably, and the piston 41 is opened rapidly, thereby enabling the fluid to flow at high pressure from one chamber to the other. Thus, the valve 40 makes it possible to reach a very high pressure with a very small displacement, of the order of a few millimeters, thereby considerably increasing the effectiveness of the device. When the device reaches the end of its stroke, the speed becomes zero, as does the pressure, and the valve re-closes. The above-described cycle can be repeated, in both fluid flow directions as long as the earthquake lasts. Thus, this both-way valve operates in both flow directions, which means that only one valve needs to be provided to achieve reliable operation (fewer moving parts, fewer resilient members, and therefore fewer sealing problems), and limited cost.

The invention therefore relates to an oleodynamic damping device including a valve 40 as described above. This valve 40 is suitable in particular for use in damping devices known from the prior art and as shown diagrammatically in FIG. 1. In that device, the wall 33 forms the piston mounted to move inside the cylinder 30, and said piston 33 is connected to the second structural element 20 via a rod 60 that passes through the two end walls of the cylinder 30, while the cylinder 30 is fixed to the first structural element 10. The valve (not shown) is, in this case, placed in the moving piston 33. The effectiveness of the known damping device is thus greatly increased by means of the invention, but the device still suffers from some drawbacks. As mentioned above, the displacements of the piston 33 depend on the compression and traction forces in the rod 60. These forces can be very large, and there is a risk that the rod might buckle.

Figure 2:
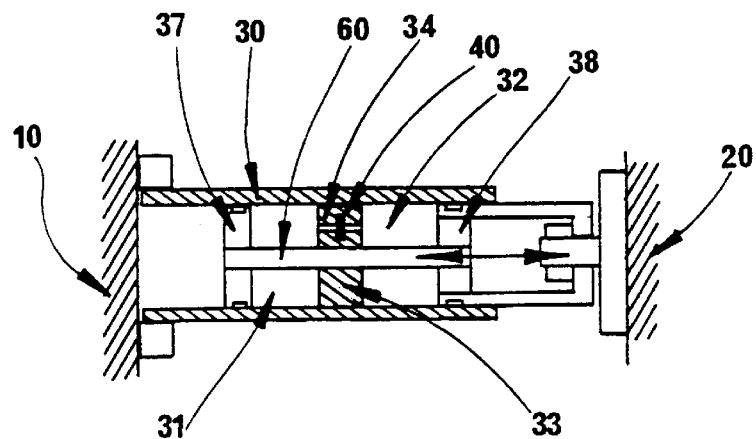
FIG. 2 is a diagrammatic view of an advantageous embodiment of a tie device of the invention.
Figure 3:
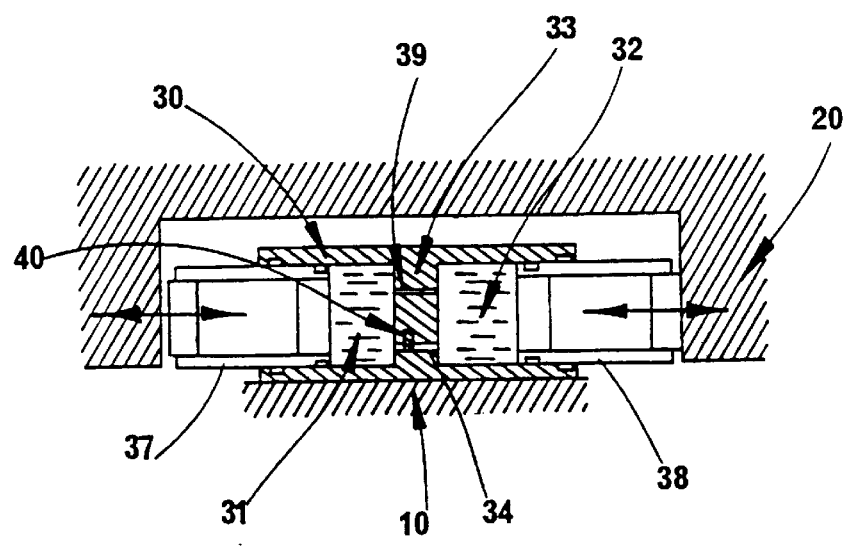
FIG. 3 is a diagrammatic view of another advantageous embodiment of a tie device of the invention.

To increase the effectiveness of the damping device of the invention still further, provision may advantageously be made to replace the moving separator wall 33 with a separator wall or diaphragm 33 that is stationary relative to the cylinder 30, as shown in FIGS. 2 and 3. The stationary wall 33 may be fixed to said cylinder (FIG. 2), or it may be integral therewith (FIGS. 3 and 4). With reference more specifically to FIG. 2, the cylinder 30 is thus fixed to the structural element 10, and the wall 33, which is stationary relative to the cylinder 30, defines the two chambers 31 and 32. Naturally, said wall 33 incorporates the passage 34, and optionally the above-described small orifice 39. Each chamber 31 and 32 is defined at its end remote from said wall 33 by a moving piston, respectively referenced 37 and 38, which piston is displaced in fluid-tight manner inside the cylinder 30. At least one of said pistons 37 and 38 is secured to the second structural element 20. In FIG. 2, the piston 38 is mechanically coupled to the second structural element 20, whereas the other moving piston 37 is secured to said first piston 38 via a rod 60 which passes through said separator wall 33 that separates the chambers 31 and 32. More specifically, the piston 38 shown in FIG. 2 may be formed by a tube which, at its end remote from the chamber 32, is provided with means for fixing to said second structural element 20, which means generally permit a small amount of pivoting. For example, the second structural element 20 may be the deck of a bridge. The main advantage of this embodiment is that the rod 60 of the device is stressed in traction only, thereby eliminating almost all danger of the rod buckling, so that the size of the rod can be minimized. This solution is particularly well suited when it is necessary to damp the effects of an earthquake in the axial direction, i.e. when the structural elements 10, 20 that are to be tied together face each other in the direction of their displacement.

In the embodiment shown in FIG. 3, which shows a tie device that couples a bridge pier 10 to a bridge deck 20, the rod 60 may be omitted all together. For this purpose, each of the two moving pistons 37 and 38 may be made in the form of a tube which, at its end in the vicinity of its respective chamber 31 or 32, moves in fluid-tight manner in the cylinder 30 which is fixed to the bridge pier 10. The other end of each of the pistons 37 and 38 is provided with stops, for example, or with any means, hinged or otherwise, enabling it to be coupled mechanically to the second structural element 20. In this case, the pistons 37 and 38 are not coupled together.

In the event of an earthquake, at least one of the two pistons 37, 38 is stressed, and it compresses the fluid in its respective chamber. Naturally, the separator wall 33 incorporates the passage 34, the valve 40, and optionally the small orifice 39, and operation of the damper is similar to that described above. In this embodiment, the device is very compact because the working section of the piston is maximized because of the absence of the rod. In addition, since the rod is replaced by tubular pistons having much larger second moments of area, buckling is much less critical, and it does not generally need to be taken into account.

Figure 5:
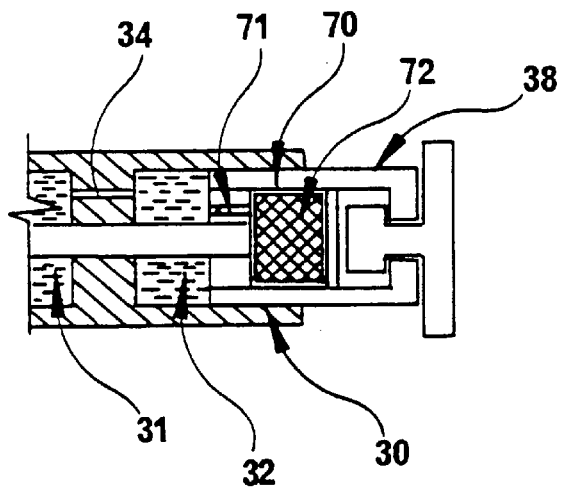
FIG. 5 is a diagrammatic view of an advantageous embodiment of a tie device of the invention incorporating an expansion vessel internal to the device.

Another advantageous characteristic of the invention is shown diagrammatically in FIG. 5. In order to avoid providing an expansion vessel or tank outside the damper device, as shown under reference 100 in FIG. 1, the invention provides a tank 70 in at least one of the moving pistons. This tank 70 is connected to at least one of said chambers 31, 32 by a small duct 71 advantageously provided with a check valve (not shown) that instantly isolates the tank 70 from the chamber to which it is connected whenever the pressure in said chamber increases above a pre-set value. The tank 70 is filled partially or totally with a compressible material 72 suitable for being compressed to enable said fluid substance to expand. For example, the compressible material 72 may be a foam made of a plastics material, e.g. an elastomer, compatible with the fluid substance used in the device. This foam contains closed air cells, and it is therefore highly compressible. It is thus the tank 70 that acts as an expansion vessel, and it does so very effectively, thereby avoiding the need to provide a hydraulic circuit external to the device.

On assembling the device, the tank 70 is filled with fluid, as are the chambers 31 and 32. The only air contained in the tank is the air in the cells of the foam 72. Under normal operating conditions, the device is not subjected to any significant internal pressure. When the temperature of the fluid increases the fluid expands, and, via the orifices which connect the chamber(s) 31, 32 to the tank 70 of the piston, the fluid compresses the air contained in the cells of the foam, thus raising the pressure of the fluid since it is confined. Since the fluid expands very slowly, it can be considered that it does so at constant temperature. The increase in the volume of fluid is thus of the same order of magnitude as the compression of the air in the cells. It is necessary merely for the volume of foam to be large enough to ensure that the overall increase is kept down to values that are entirely acceptable, of about a few bars at the most. Another advantage of this embodiment is that it has no vents or bleed points, and it thus enables the device to be installed and to operate in any position. The check valve (not shown) provided on the duct 71 enabling the chambers 31, 32 to communicate with the foam-containing tank 70 protects the tank and the foam against any possible deterioration while the device is in operation during an earthquake, in which case the pressure in the chambers can reach several hundred bars.

It should be noted that this advantageous characteristic of making it possible to omit the external expansion vessel is more particularly suitable for the embodiments of the invention shown in FIGS. 2 and 3, in which the central moving piston 33 of the damper shown in FIG. 1 is replaced by one or two pistons 37, 38 that are tubular in shape. In which case, the tank 70 can be provided inside the tube forming the piston(s) 37, 38, as shown in FIG. 5.

The embodiment of the invention that combines all of the above-mentioned advantages to the maximum extent thus consists of an oleodynamic damping device implemented as in either of the embodiments shown in FIGS. 2 and 3, including a valve of the invention and incorporating an expansion vessel as shown in FIG. 5. It should be noted that the embodiment of the device shown in FIG. 4, which shows the valve 40 in more detail, relates more particularly to the embodiment shown in FIG. 3 because a rod does not pass through the wall 33. Clearly, this valve is also suitable for all of the other above-described embodiments of the invention.

What is claimed is:

1. A damping device for use between first and second elements (10, 20) of a civil engineering structure, the damping device being suitable for damping at least in part relative displacements between said first and second structural elements (10, 20) during rapid movements, said device including both a cylinder (30) which is stationary relative to said first structural element (10) and which defines two chambers (31, 32) that are separated by a wall (33) and that contain a fluid substance, and at least one moving piston (37, 38) mounted to slide in said stationary cylinder (30), said wall (33) being provided with at least one passage (34) which interconnects the two chambers (31, 32), said damping device being characterized in that it is provided with at least one both-way valve (40) which, at rest, shuts off said passage (34) and which, when the pressure in any one of said chambers (31, 32) increases due to said second structural element (20) moving rapidly relative to said first structural element (10), opens said passage (34), thereby enabling the fluid to flow at high pressure from any one chamber to the other, said valve (40) being urged towards its closed position by a resilient member (45) wherein said valve (40) includes a valve piston (41) mounted to slide in a channel (42) that is substantially perpendicular to said passage (34) between a closed position, in which it shuts off said passage (34) in fluid-tight manner and an open position, in which it opens said passage (34), said piston (41) being urged towards its closed position by a spring (45) of adjustable pressure.

2. A device according to claim 1, in which said valve piston (41) is substantially cylindrical, and, at its end that shuts off the passage (34) when it is in the closed position, said piston is provided with at least one notch (50) that is open to said passage (34) so that, when pressure rises in one of the chambers (31, 32), the valve piston (41) opens said passage (34) against the pressure from the spring (45) by means of the axial component of the force that is applied in said at least one notch (50).

3. A device according to claim 1, in which the spring (45) firstly acts on said valve piston (41) and secondly is secured to a first stop member (43a) whose position in said channel (42) may be set as a function of the desired pressure of the spring (45).

4. A device according to claim 1, in which said channel (42) is provided with a second stop member (43b) whose position is adjustable and which terminates in said passage (34), the valve piston (41) co-operating with said second stop member (43b) when it is in the closed position, the presence of said second stop member (43b) forming a portion of reduced diameter in the passage (34), the passage portion of reduced diameter determining the damping performance by headloss of the device.

5. A device according to claim 4, in which said passage (34) is provided with at least one portion of reduced diameter that determines the damping performance by headloss of the device.

6. A device according to claim 1, in which said separator wall (33) for separating the two chambers (31, 32) is further provided with a small orifice (39) which interconnects said two chambers (31, 32) so as to enable said structural elements (10, 20) to be displaced relative to each other during slow movements.

7. A device according to claim 1, in which said civil engineering structure is a bridge, and said first and second structural elements (10, 20) may be an abutment, a pier, or a deck of a bridge.

* * * * *